United States Patent Office 3,036,883
Patented May 29, 1962

3,036,883
PRODUCTION OF AMMONIUM THIOCYANATE
William R. Rolingson, Texas City, Tex., assignor to Monsanto Chemical Company, St. Louis, Mo., a corporation of Delaware
No Drawing. Filed Oct. 19, 1959, Ser. No. 847,062
2 Claims. (Cl. 23—75)

The present invention relates to a novel method of preparing ammonium thiocyanate.

It has now been discovered that methane, ammonia, and sulfur can be reacted at elevated temperatures to yield ammonium thiocyanate which is readily recoverable by conventional techniques such as leaching with water, for example.

The following examples illustrate the invention but are not to be construed as limiting it in any manner whatsoever.

Example 1

The apparatus employed consisted of a sulfur vaporizer and a reactor. The vaporizer was a closed glass tube approximately 11 in. long and 1 in. in diameter having a side arm about 3 in. down from the top. It was closed at the top with a standard taper joint fitted with a dip tube long enough to extend down into the vaporizer to within an inch of the bottom. Heat was supplied to the vaporizer by means of resistance wire wrapping which was covered with asbestos insulation.

The vaporizer was connected via its side arm to the reactor, a horizontally disposed quartz tube about 36 in. long and approximately ½ in. in diameter. The central 18 inches of the reactor which was packed with quartz chips was heated by means of resistance wire wrapping and the necessary insulation. The side arm of the vaporizer and that part of the reactor to which it was connected just ahead of the heated section were wrapped with electric heating tape to provide a high enough temperature to eliminate heat loss between the vaporizer and the heated section of the reactor. The cooler end of the reactor on the exit side was filled with glass wool to provide a condensing surface for reaction products. Temperatures in the reactor and vaporizer were recorded by means of iron-constantan thermocouples inserted in thermowells.

Sulfur in powdered form was charged to the vaporizer heated to a temperature of about 340° C. The gaseous reactants, ammonia and methane (research grade) were fed through flowmeters at rates of approximately 1.0 mole per hr. and 0.5 mole per hr., respectively, mixed in a glass manifold, and then passed down through the dip tube in the vaporizer so that they bubbled through the molten sulfur. The gas mixture saturated with sulfur vapor left the vaporizer through the side arm and was conducted through the reactor, the heated section of which was maintained at a temperature of about 1150° C. At the end of the 18-min. reaction period, the feed was discontinued, the reactor was cooled and the glass wool was removed. Condensation products deposited on the glass wool were extracted by washing the material in water and filtering. The filtrate was diluted to about 250 ml. and an aliquot of it was acidified with nitric acid after which several drops of ferric alum was added to it. The deep red color characteristic of ammonium thiocyanate was obtained. This was then titrated with standard silver nitrate to the disappearance of the red color and the amount of ammonium thiocyanate produced was calculated. The yield in this run was about 5% based on the theoretical possible.

Further verification of the product as ammonium thiocyanate was obtained by acidifying another portion of the filtrate with nitric acid, then adding silver nitrate to precipitate the silver salt, and obtaining an infrared spectrum of this product. The infrared spectrum obtained was identical with that of the silver salt prepared from known ammonium thiocyanate.

Example 2

Using the same equipment and the same procedure, a series of experiments were made at different temperatures and at different reactant ratios. The conditions and the results obtained in these runs are tabulated below.

| $NH_3$ (Mol/hr.) | $CH_4$ (Mol/hr.) | S (Mol/hr.) | Temp. | Once-Through Yield $NH_4$-SCN, percent |
|---|---|---|---|---|
| 0.5 | 0.25 | 1.0 | 800 | 6.1 |
| 0.5 | 0.25 | 1.0 | 700 | 2.1 |
| 0.5 | 0.25 | 2.0 | 800 | 2.8 |
| 1.0 | 0.25 | 1.0 | 800 | 3.6 |

The invention is not to be considered as limited to the specific conditions set forth in the examples since variations from these may be made without departing from the scope of the invention. Any temperature above about 700° C., for example, may be employed, the upper limit being set mainly by practical considerations. Preferably, the temperature is maintained within the range from about 700° C. to about 1200° C.

The ratio of reactants may also be varied without seriously affecting the reaction. Preferably, the stoichiometric quantities for the reaction as represented by the following equation are employed.

$$2NH_3 + CH_4 + 4S \rightarrow NH_4SCN + 3H_2S$$

Excesses of one or more of the reactants can be used but large excesses of the hydrocarbon should be avoided. While heat transfer is facilitated by the use of an inert material as packing in the reactor, this is not necessary and the reaction can also be conducted in an empty tube.

The reaction while preferably conducted at atmospheric pressure may be carried out at superatmospheric pressure if desired. Also, it may be carried out as a batch or continuous operation.

Recovery of the product thiocyanate is simple involving only conventional techniques such as condensation of the ammonium thiocyanate from the effluent gas, extraction of the condensed solids with water, and subsequent crystallization, if desired, from the aqueous solution.

An advantage of the process is that the hydrogen sulfide by-product can be readily converted by oxidation to sulfur which can be recycled to the process.

What is claimed is:

1. A process for the production of ammonium thiocyanate which comprises reacting ammonia, methane and sulfur in amounts such that the mole ratio of methane to ammonia is from about 1:2 to about 1:4 and the mole ratio of methane to sulfur is from about 1:4 to about 1:8 at a temperature of at least 700° C. and recovering ammonium thiocyanate from the product effluent gas.

2. A process for the production of ammonium thiocyanate which comprises reacting ammonia, methane and sulfur in amounts such that the mole ratio of methane to ammonia is about 1:2 and the mole ratio of methane to sulfur is about 1:4 at a temperature in the range from about 700° C. to about 1200° C. and recovering ammonium thiocyanate from the product effluent gas.

References Cited in the file of this patent

UNITED STATES PATENTS

| 1,907,274 | Wheeler et al. | May 2, 1933 |
| 2,187,393 | De Simo | Jan. 16, 1940 |
| 2,286,273 | Hill | June 16, 1942 |
| 2,850,356 | Sutherland et al. | Sept. 2, 1958 |